United States Patent
Sukonik et al.

(10) Patent No.: US 9,749,255 B2
(45) Date of Patent: Aug. 29, 2017

(54) METHOD, NETWORK DEVICE, COMPUTER PROGRAM AND COMPUTER PROGRAM PRODUCT FOR COMMUNICATION QUEUE STATE

(75) Inventors: Vitaly Sukonik, Il-Katzir (IL); Sarig Livne, Il-Ramat Gan (IL); Mark Dunaevsky, Il-Kfar Saba (IL); Jakob Carlström, Uppsala (SE)

(73) Assignee: Marvell World Trade Ltd., St. Michael (BB)

( * ) Notice: Subject to any disclaimer, the term of this patent is extended or adjusted under 35 U.S.C. 154(b) by 169 days.

(21) Appl. No.: 13/529,698

(22) Filed: Jun. 21, 2012

(65) Prior Publication Data

US 2013/0003752 A1 Jan. 3, 2013

Related U.S. Application Data

(60) Provisional application No. 61/503,022, filed on Jun. 30, 2011.

(30) Foreign Application Priority Data

Jun. 30, 2011 (GB) .................................. 1111106.9

(51) Int. Cl.
*H04L 12/28* (2006.01)
*H04L 12/863* (2013.01)

(52) U.S. Cl.
CPC ................................ *H04L 47/6255* (2013.01)

(58) Field of Classification Search
CPC ......... H04L 12/50; H04L 49/90; H04L 49/00; H04L 47/30; H04L 49/505; H04L 47/12
USPC ...... 370/412, 395.4, 235, 413, 428; 709/235
See application file for complete search history.

(56) References Cited

U.S. PATENT DOCUMENTS

| | | | |
|---|---|---|---|
| 6,252,848 B1 * | 6/2001 | Skirmont | H04L 47/10 370/229 |
| 6,272,143 B1 * | 8/2001 | Lin et al. | 370/412 |
| 6,687,247 B1 * | 2/2004 | Wilford | H04L 12/5693 370/392 |
| 6,690,646 B1 * | 2/2004 | Fichou | H04L 41/0896 370/231 |

(Continued)

FOREIGN PATENT DOCUMENTS

| | | |
|---|---|---|
| CN | 1866927 A | 11/2006 |
| CN | 101014002 A | 8/2007 |
| CN | 101286947 A | 10/2008 |

OTHER PUBLICATIONS

Combined Office Action and Search Report issued Aug. 17, 2016 in Chinese Patent Application No. 201210229657.6 (with English translation and English translation of Categories of Cited Documents).

(Continued)

*Primary Examiner* — Khaled Kassim
*Assistant Examiner* — Berhanu Belete

(57) ABSTRACT

Aspects of the disclosure provide a method for communicating queue information. The method includes determining a queue state for each one of a plurality of queues at least partially based on respective queue length, selecting a queue with a greatest difference between the queue state of the queue and a last reported queue state of the queue, and reporting the queue state of the selected queue to at least one node.

17 Claims, 6 Drawing Sheets

(56) References Cited

U.S. PATENT DOCUMENTS

| | | | | |
|---|---|---|---|---|
| 6,717,945 B1* | 4/2004 | Jue | H04L 12/5601 | 370/392 |
| 6,765,873 B1* | 7/2004 | Fichou | H04L 12/5695 | 370/230 |
| 7,016,366 B2* | 3/2006 | Kawarai | H04L 12/5693 | 370/389 |
| 7,158,480 B1* | 1/2007 | Firoiu | H04L 47/10 | 370/235 |
| 7,180,862 B2* | 2/2007 | Peebles | H04L 47/10 | 370/235 |
| 7,317,730 B1* | 1/2008 | Devanagondi | H04L 47/10 | 370/412 |
| 7,606,154 B1* | 10/2009 | Lee | | 370/232 |
| 8,144,588 B1* | 3/2012 | Ma | H04L 47/30 | 370/235 |
| 8,477,615 B2* | 7/2013 | Prabhakar | H04L 47/10 | 370/230.1 |
| 2003/0058880 A1* | 3/2003 | Sarkinen | H04L 12/5693 | 370/413 |
| 2004/0085864 A1* | 5/2004 | Terao | G11B 19/04 | 369/30.05 |
| 2004/0090974 A1* | 5/2004 | Balakrishnan et al. | | 370/412 |
| 2004/0095885 A1* | 5/2004 | Yang | H04L 12/5693 | 370/235.1 |
| 2004/0163084 A1* | 8/2004 | Devadas | H04L 12/5693 | 718/103 |
| 2004/0179535 A1* | 9/2004 | Bertagna | H04L 49/90 | 370/395.21 |
| 2005/0094643 A1* | 5/2005 | Wang | H04L 12/5693 | 370/395.4 |
| 2006/0165070 A1* | 7/2006 | Hall | H04L 49/101 | 370/369 |
| 2007/0016907 A1* | 1/2007 | Benedetti | G06F 9/5038 | 718/104 |
| 2007/0047535 A1* | 3/2007 | Varma | | 370/360 |
| 2007/0070907 A1* | 3/2007 | Kumar | H04L 47/10 | 370/235 |
| 2007/0091802 A1* | 4/2007 | Pan et al. | | 370/230 |
| 2007/0133596 A1* | 6/2007 | Kim | H04J 3/1694 | 370/465 |
| 2007/0248009 A1* | 10/2007 | Petersen | H04L 12/4633 | 370/230 |
| 2007/0248086 A1* | 10/2007 | Petersen | H04L 49/15 | 370/389 |
| 2008/0175149 A1* | 7/2008 | Andrews et al. | | 370/235 |
| 2009/0280749 A1* | 11/2009 | Tanno | H04L 12/2854 | 455/67.13 |
| 2010/0172363 A1* | 7/2010 | Sindhu | H04L 47/10 | 370/412 |
| 2010/0205382 A1* | 8/2010 | Giacobbe | H04L 47/29 | 711/147 |
| 2011/0051604 A1* | 3/2011 | Nishimura | | 370/235 |
| 2011/0128847 A1* | 6/2011 | Noguchi | H04L 47/10 | 370/230.1 |
| 2011/0176554 A1* | 7/2011 | Yamada et al. | | 370/412 |
| 2011/0194426 A1* | 8/2011 | Fang et al. | | 370/252 |
| 2012/0155256 A1* | 6/2012 | Pope et al. | | 370/230 |
| 2013/0028220 A1* | 1/2013 | Andreozzi | H04W 72/1252 | 370/329 |
| 2013/0128814 A1* | 5/2013 | Pera | H04W 74/06 | 370/328 |

OTHER PUBLICATIONS

Office Action issued in Chinese Application No. 201210229657.6 dated Apr. 10, 2017 with English translation.

Combined Office Action and Search Report dated Aug. 17, 2016 in Chinese Patent Application No. 201210229657.6 (with English translation and English translation of Categories of Cited Documents).

* cited by examiner

METHOD, NETWORK DEVICE, COMPUTER PROGRAM AND COMPUTER PROGRAM PRODUCT FOR COMMUNICATION QUEUE STATE

INCORPORATION BY REFERENCE

This present disclosure claims the benefit of U.S. Provisional Application No. 61/503,022, "Method, Network Device, Computer Program and Computer Program Product for Communication Queue State," filed on Jun. 30, 2011, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A network device can include an ingress side that receives network traffic from other network devices, and an egress side that outputs the network traffic to the other network devices. Traffic output and queue state on the egress side can affect incoming traffic on the ingress side.

SUMMARY

Aspects of the disclosure provide a method for communicating queue information. The method includes determining a queue state for each one of a plurality of queues, such as egress queues and the like, at least partially based on respective queue length, selecting a queue with a greatest difference between the queue state of the queue and a last reported queue state of the queue, and reporting the queue state of the selected queue to at least one node, such as an ingress node, and the like.

To determine the queue state for each one of the plurality of queues, in an embodiment, the method includes determining a drop probability respectively for the queues. For example, the method uses a variable taking up between 1 and 32 bits to represent the drop probability. In another embodiment, the method includes determining a queue length respectively for the queues.

To report the queue state of the selected queue to at least one ingress node, in an embodiment, the method includes reporting to the ingress node in a same device. In another embodiment, the method includes sending a message including the queue state to the ingress node in another device.

Further, in an embodiment, the method includes waiting until a predetermined data volume has been processed to repeat the determining, selecting and reporting operations. In another embodiment, the method includes waiting for a predetermined time to repeat the determining, selecting and reporting operations.

To select the queue with the greatest difference between the queue state of the queue and the last reported queue state of the queue, in an embodiment, the method includes selecting the queue with a greatest absolute difference between the queue state of the queue and the last reported queue state of the queue.

Aspects of the disclosure provide an apparatus. The apparatus includes a plurality of queues, such as egress queues, respectively configured to queue packets, and a controller configured to determine a queue state for each one of the plurality of queues at least partially based on respectively queue length, and select a queue with a greatest difference between the queue state of the queue and a last reported queue state of the queue for reporting the queue state to a node, such as a node at the ingress side.

Aspects of the disclosure also provide a non-transitory computer readable medium storing program instructions for causing a processor to execute operations for queue communication. The operations include determining a queue state for each one of a plurality of queues at least partially based on respectively queue length, selecting a queue with a greatest difference between the queue state of the queue and a last reported queue state of the queue, and reporting the queue state of the selected queue to at least one node.

Aspects of the disclosure provide a system. The system includes a plurality of interface units configured to have ingresses to receive packets coming into the system, and have egresses to transmit packets out of the system. At least one interface unit includes a plurality of queues respectively configured to queue packets for outputting, and a controller configured to determine a queue state for each one of the plurality of queues at least partially based on respectively queue length, and select a queue with a greatest difference between the queue state of the queue and a last reported queue state of the queue for reporting the queue state of the selected queue to at least one ingress.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
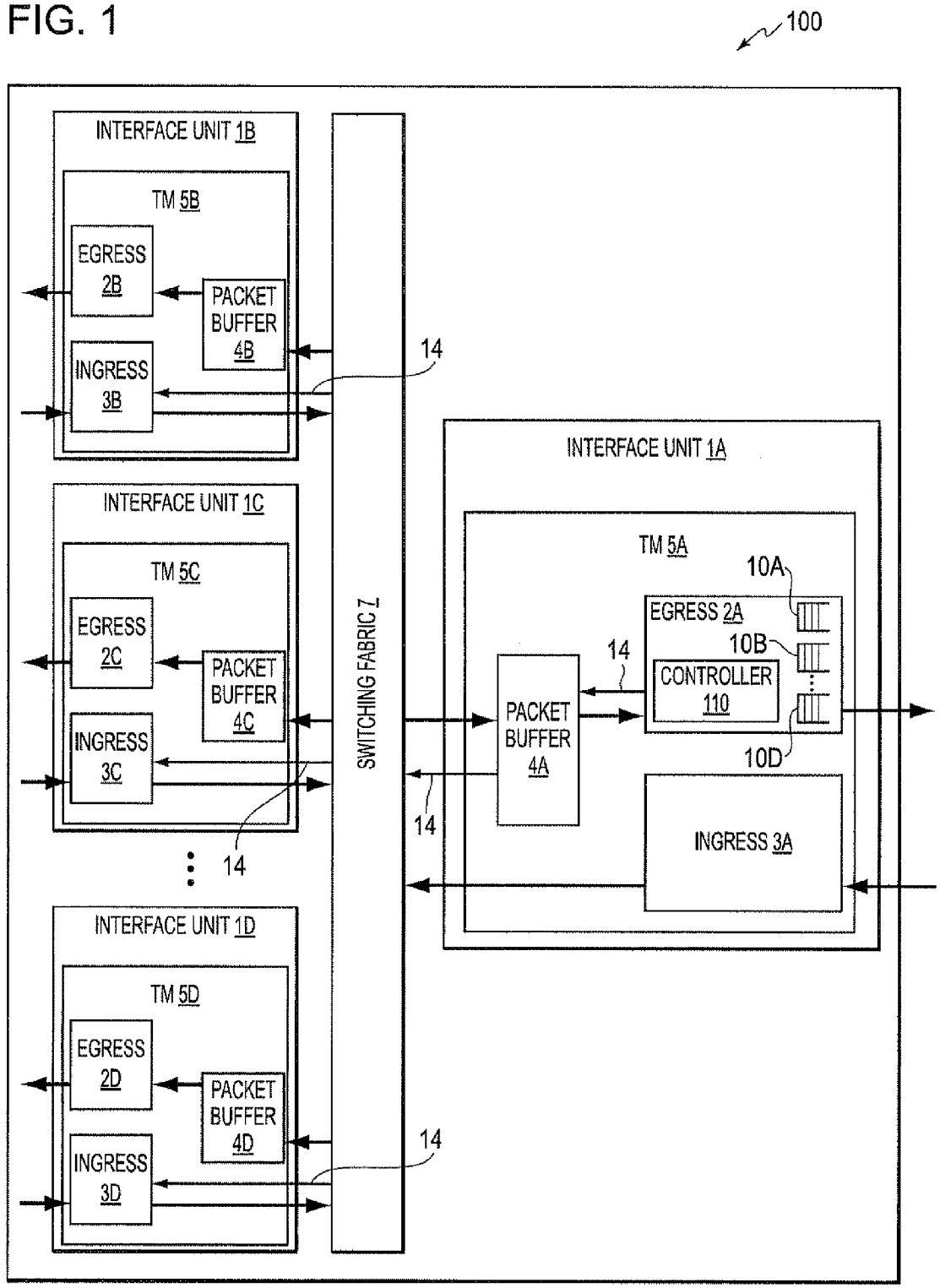
FIG. 1 is a schematic diagram of a network system 100 according to an embodiment of the disclosure.

FIG. 1 is a schematic diagram of a network system 100 according to an embodiment of the disclosure. The network system 100 includes interface units 1A-D. In the FIG. 1 example, the interface units 1A-D are connected to each other via a switching fabric 7. Each interface unit 1A-D is capable of receiving data into the network system 100 and sending data out of the network system 100. These elements are coupled together as shown in FIG. 1.

The network system 100 can be any suitable network system. In an embodiment, the network system 100 is a data center. The interface units 1A-D are top of rack (TOR)

switches and the switching fabric 7 includes aggregation switches. The TOR switches are coupled to various servers, drives, central processing units (CPUs), and the like, and the aggregation switches switch traffic among the TOR switches, for example.

In another embodiment, the network system 100 is a switching device, such as a router, a network switch, and the like. In an example, each of the interface units 1A-D is network processing unit (NPU) or a line card comprising an NPU. The switching fabric 7 includes fabric cards that couple the line cards together.

In another example, the network system 100 is implemented on a single integrated circuit (IC) chip. The interface units 1A-D are input/output (I/O) ports on the IC chip. Each of the I/O ports includes an ingress portion to receive network traffic into the IC chip, and an egress portion configured to transmit network traffic out of the IC chip. The IC chip also includes a network processor to process the received network traffic. In an example, the network processor operates with other suitable components of the IC chip, such as memory, data bus, and the like to serve as the switching fabric 7 to direct the network traffic to the suitable I/O ports.

In an embodiment, the interface units 1A-D handle data in individual data packets or datagrams, such as IP (Internet Protocol) packets, ATM (Asynchronous Transfer Mode) frames, Frame Relay Protocol data units (PDU), Ethernet packets or any other packet switched data. In another embodiment, several individual data packets are grouped together in a package for more efficient handling. For ease of explanation, the term packets are used herein, referring to individual packets or packages of one or more packets, as applicable in implementation.

According to an aspect of the disclosure, the interface units 1A-D include respective traffic managers (TM) 5A-D responsible for management for the input and output of data of the respective interface units 1A-D. In an embodiment, the traffic managers 5A-D include respective packet buffers 4A-D, egress queuing systems 2A-D and ingress queuing systems 3A-D. The packet buffers 4A-D are used to store packets waiting to be scheduled and delay the packets which are not eligible for transmitting because of line congestion or shaping, for example. The egress queuing systems 2A-D include respective egress queues (shown only in a first egress queuing system 2A but present in all egress queuing systems) and the ingress queuing systems 3A-D include respective ingress queues (not shown). Each egress queuing system 2A-D and ingress queuing system 3A-D can include hundreds or even thousands of queues.

In the FIG. 1 example, the switching fabric 7 is used to allow switching of data traffic and control traffic on a control channel 14 between the traffic managers 5A-D of the different interface units 1A-D. The switching fabric 7 can be of any suitable topology, such as from complete point-to-point connection of the line cards (no fabric devices) to hierarchical multi-level switching with star topology. The switching fabric 7 can, for example, be implemented using a shared memory, a Banyan switch, a Batcher-Banyan switch, a cross-connect, or a data bus.

In FIG. 1, flow of payload data packets is illustrated with thick arrows and (selected) control traffic is illustrated with thin arrows. The queue state of egress queues 10A-D of the first egress queuing system 2A of a first interface unit 1A is communicated to all other interface units 1B-D of the network system 100. Analogously, queue states of egress queues of any other egress queuing system 2B-D can be communicated to all other interface units. The control channels for such communication are not shown in FIG. 1 but correspond to what is shown for communication of the egress queues 10A-D of the first egress queuing system 2A.

According to an aspect of the disclosure, the first egress queuing system 2A includes a controller 110 configured to select one of the egress queues 10A-D, and report the queue state of the selected egress queue to other interface units 1B-D of the network system 100. The queue state can be any parameter that is indicative of the queuing status of the selected egress queue, such as queue length, drop probability, a combination of queue length and drop probability, and the like.

In an embodiment, the controller 110 is configured to keep a record of a last reported queue state for each of the egress queues 10A-D. In an example, the last reported queue state for each of the egress queues 10A-D is stored in a memory that is accessible to the controller 110. Further, the controller 110 determines a present queue state for each of the egress queues 10A-D. Then, the controller 110 selects an egress queue with a greatest difference between the present queue state of the egress queue and the last reported queue state of the egress queue. The controller 110 then causes reporting the present queue state of the selected egress queue to the other interface units 1B-D. In an example, the controller 110 updates the record of the lasted reported queue state for the selected egress queue.

According to an aspect of the disclosure, the present queue state of the selected egress queue is used by the ingress queuing system 3B-D to determine ingress queuing strategy, such as packet dropping strategy, and the like.

Figure 2:
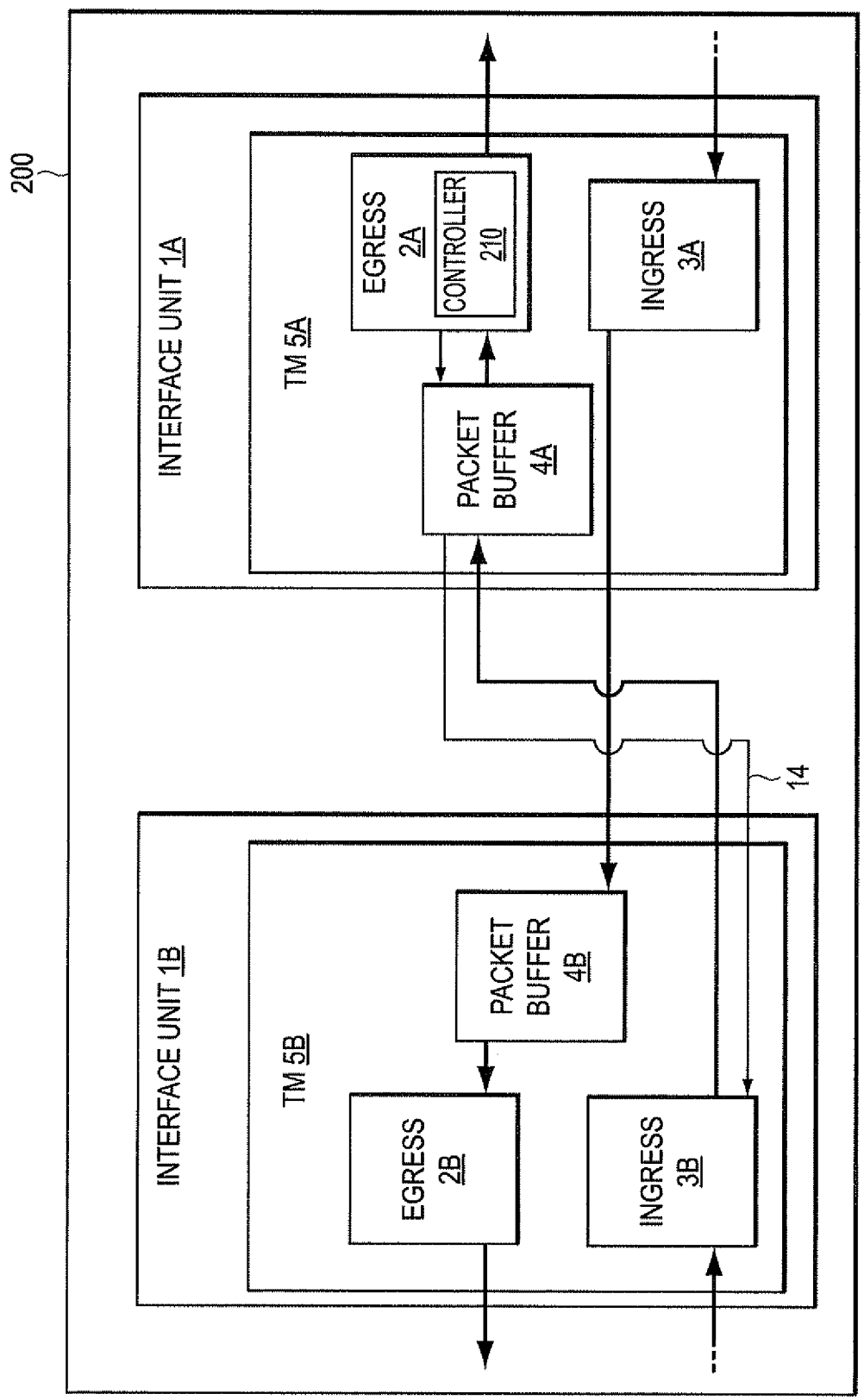
FIG. 2 is a schematic diagram of a network system 200 according to an embodiment of the disclosure.

FIG. 2 is a schematic diagram of a network system 200 according to another embodiment of the disclosure. In this embodiment, there are only two interface units 1A and 1B. Also, there is no switching fabric and instead the two interface units 1A-B are directly connected to each other. With no switching fabric, this is a simpler and thus less expensive and less complicated structure than the embodiment illustrated in FIG. 1. However, the topology of FIG. 1 is more flexible, allowing simple addition or removal of interface units.

The network system 200 also utilizes a controller 210, that is identical or equivalent to the controller 110 used in the network system 100; the description has been provided above and will be omitted here for clarity purposes.

Figure 3:
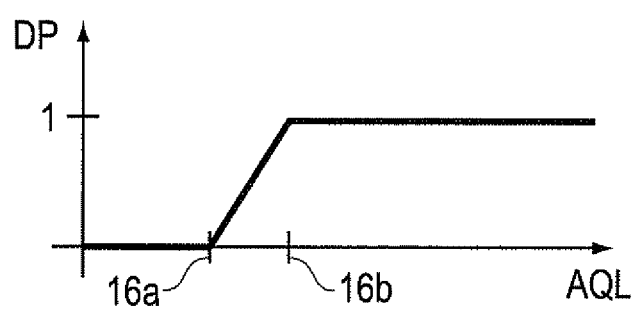
FIG. 3 is a schematic graph illustrating one example of a relationship between average queue length and drop probability.

FIG. 3 is a schematic graph illustrating one example of a model of the relationship between average queue length and drop probability. There is a strong relationship between average queue length (AQL), and drop probability (DP). Up until a first AQL 16a, the drop probability of an additional packet is zero. When the AQL exceeds a second AQL 16b, the queue is so long that an additional packet is dropped, whereby the drop probability in this case is 1. Between the first AQL 16a and second AQL 16b, the drop probability increases linearly. There are several alternative models to the one shown in FIG. 3. For example, the linear increase between 16a and 16b does not reach drop probability 1 but a lower probability P. At 16b the curve has a discontinuity and "jumps" from P to 1.

Figure 4A:
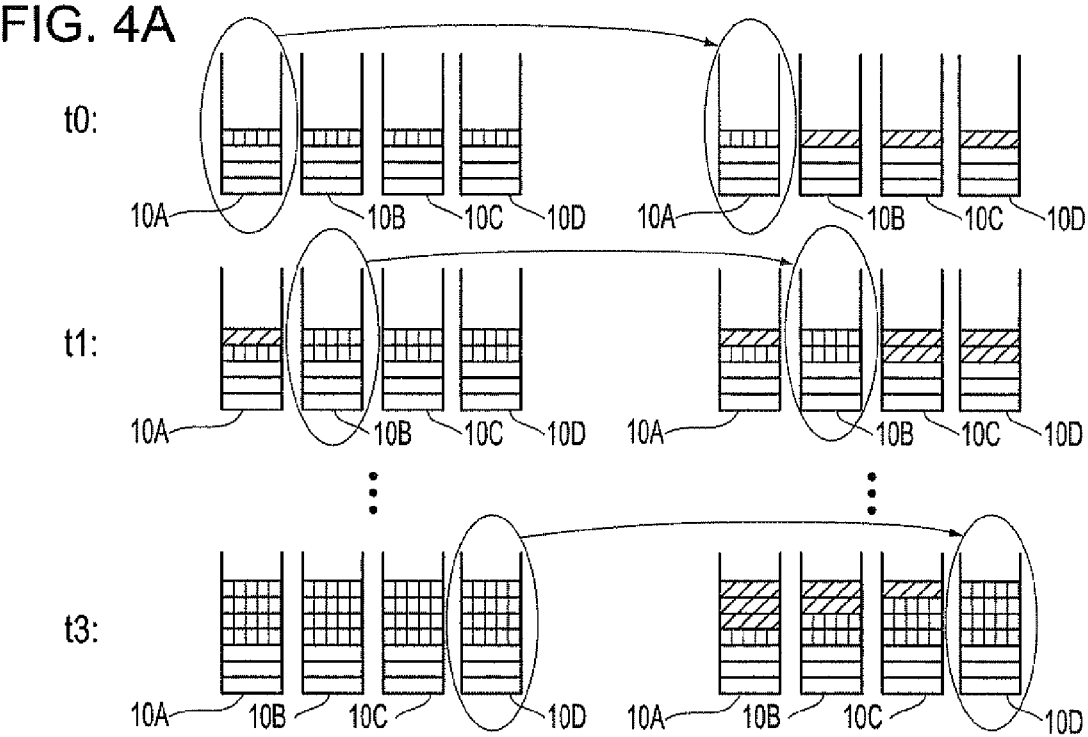
FIG. 4a is a schematic diagram illustrating the communication of queue state from the egress queues to the ingress side of FIGS. 1 and 2 according to a first example.
Figure 4B:
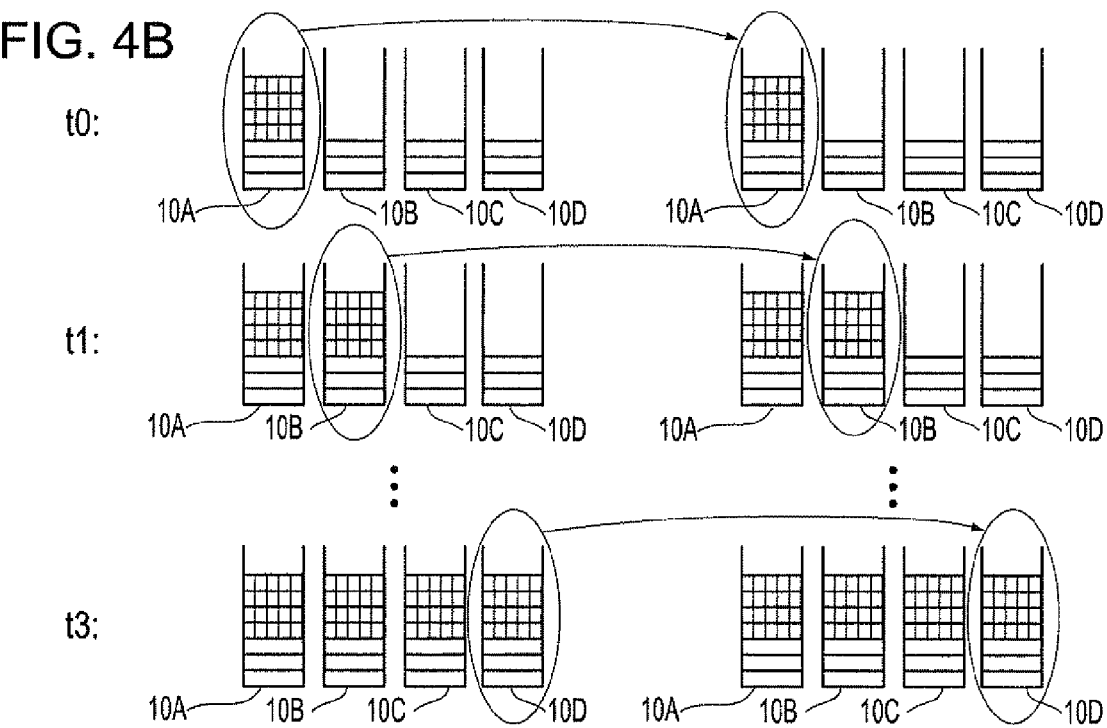
FIG. 4b is a schematic diagram illustrating the communication of queue state from the egress queues to the ingress side of FIGS. 1 and 2 according to a second example.

FIGS. 4A-B are schematic diagrams illustrating the communication of queue state from the egress queues to the ingress side of FIGS. 1 and 2 according to a first and second example respectively. This can for instance be communication of the egress queue state of the egress queues 10A-D of the first interface unit 1a of FIGS. 1 and 2. The principle used in embodiments presented herein is that the queue state of the egress queue that has the greatest change is communicated to the ingress side. The queue state difference is determined as a difference between the actual egress queue state and the last reported egress queue state, i.e. the ingress view of the queue state. Here, the queue state is taken to be queue length, for ease of explanation, but any suitable measurement of queue state can be used.

The left hand side of the diagram is an egress side showing the actual state of egress queues 10A-D of a first traffic manager, e.g., the first traffic manager (5A of FIG. 1 or FIG. 2), comprising the egress queues 10A-D. In reality, many more egress queues (e.g., hundreds or thousands) can be part of the system, but for ease of explanation it is here only shown four egress queues 10A-D. Hereinafter, the egress queues are referred to the first queue 10A, second queue 10B, third queue 10C and fourth queue 10D, as seen from left to right. The right hand side of the diagram is an ingress side showing the state of the same egress queues 10A-D, according to information available to the other traffic managers (5B-D of FIG. 1 or 5B of FIG. 2). The states are shown in order of time vertically, from t0 to t3 in FIGS. 4A-B. Diagonally dashed packets in the queues are packets which have not been communicated to the ingress side and vertically dashed packets in the queues are packets which have been communicated from the egress side to the ingress side. The circled queues and the arrow between them for each time indicate for which queue the state of the queue is communicated from the egress side to the ingress side.

In the example of FIG. 4A, packets added to the egress queues 10A-D are uniformly distributed between the egress queues 10A-D. Here, four packets are received between each time t0-t3, where each egress queue 10A-D receives one packet.

At time t0, four new packets have arrived to the egress queues, where each egress queue receives one packet. The queue state used in this example is queue length, and all queues have changed the same amount, i.e. one packet. Hence, there is no unambiguous pointer to which queue to send information about to the ingress side. In that situation, any of the queues can be selected. In this example, the first queue 10A is selected and its state is sent in a message to the ingress side. The traffic manager(s) on the ingress are thus aware of the current state of the first queue, indicated by the vertically dashed packet for the first queue on the ingress side. However, the state of the other queues have not been updated and the ingress side is unaware of the newly enqueued packets for the second, third and fourth queues 10B-D, as indicated by diagonally dashed packets.

At time t1, four new packets have arrived in the queues, where each queue again receives one packet. Bearing in mind that the queue state used in this example is queue length, the queues with the greatest difference between the actual queue state and the ingress view are the second, third and fourth queues 10B-D. Here the difference is two packets while the difference is only one packet for the first queue 10A. Hence any of the states for the second, third or fourth queues 10B-D can be reported. In this example, the state of the second queue 10B is reported.

Analogously, at time t2 (not shown), the state of the third queue 10C is reported from the egress side to the ingress side.

At time t3, the queue with the greatest difference between actual queue length and reported queue length is the fourth queue 10D, whereby the state of the fourth queue 10D is reported from the ingress side to the egress side.

It is to be noted that in this example, there is never a complete correspondence between the ingress view of the egress queues and the actual state of the egress queues.

In the example of FIG. 4B, packets are added to the egress queues 10A-D four at a time to a respective one of the egress queues 10A-D.

At time t0, the first queue 10A has received four packets. It is evident that the greatest difference between the actual egress queue state and the ingress view of the queue state is for the first queue 10A. Consequently, the state of the first queue is sent from the egress side to the ingress side.

At time t1, four packets have been received by the second queue, whereby the state of this queue is reported from the egress side to the ingress side.

Analogously, at time t2 (not shown), the state of the third queue 10C is reported and at time t3, the state of the fourth queue 10D is reported. In this example, there is a complete correspondence between the ingress view of the egress queues and the actual state of the egress queues after each queue state message.

Figure 5:
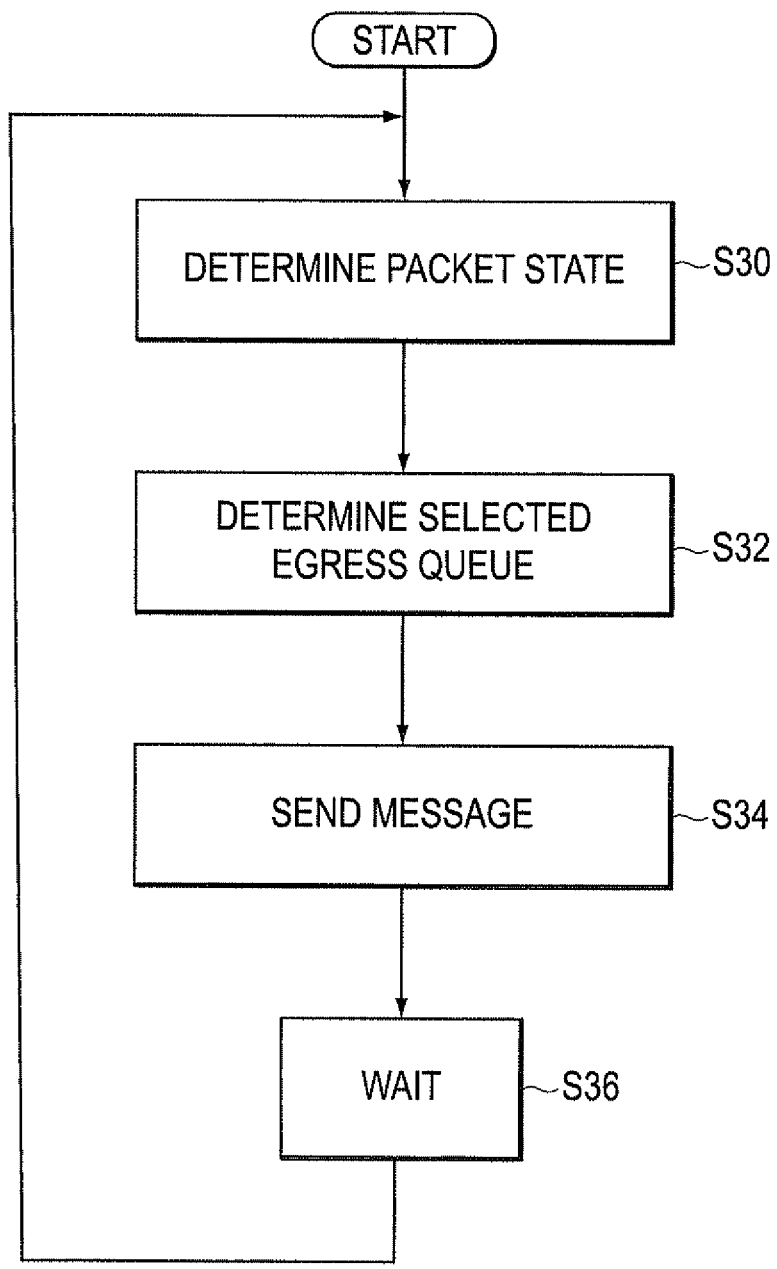
FIG. 5 is a flow chart illustrating a method performed in a network system of FIG. 1 or 2.

FIG. 5 is a flow chart illustrating a method performed in the interface unit 1A of FIG. 1 or 2.

At S30, the interface unit 1A determines a queue state for each one of the plurality of egress queues 10A-D. The queue state can, for example, be drop probability, queue length or even a combination of both. While the queue length properly reflects the size of the queue and is valuable in its accuracy, drop probability has several advantages. Firstly, drop probability can be usefully encoded with few bits, e.g., 4 bits. Moreover, unlike queue length, drop probability also takes into account the bandwidth. For example, a queue of 1 MB (megabyte) for a 10 Gbps (gigabits per second) flow has a different drop probability than a queue of 1 MB of a 1 Mbps (megabits per second) flow.

At S32, the interface unit 1A determines a selected egress queue, selected from the plurality of egress queues 10A-D. The selected egress queue is the one with the greatest difference between the determined queue state and the last reported queue state of the selected egress queue.

At S34, a message is sent to at least one ingress node, such as at least one of the ingress queuing systems 3B-D. The message includes the queue state of the selected egress queue. The message is sent using the control channel 14 as shown in FIG. 1, e.g., as a multicast message to all connected interface units 1B-D. Once the ingress side, such as the ingress queuing systems 3B-D, has received information about the queue state of the egress side, such as the egress queuing system 2A, the ingress side can act on this information.

In an example, in a time duration, an egress queue is very long, and additional packets to the egress queue are dropped. The egress queue has a greatest difference between the present drop probability and the last reported probability. The queue state, such as the drop probability, of the egress queue is reported to the ingress queuing systems 3B-D. The ingress queuing systems 3B-D suitably drop a portion or all packets bound for the egress queue.

At S36, the interface unit 1A waits until it is time to repeat the flow and return to S30. In one embodiment, the interface unit 1A waits until a predetermined data volume has been processed by the interface unit 1A, as measured either as incoming data or outgoing data. In another embodiment, the interface unit 1A waits a predetermined time. Because periodicity of messages reporting queue state is defined, the maximum bandwidth required for these messages is clearly defined.

Figure 6:
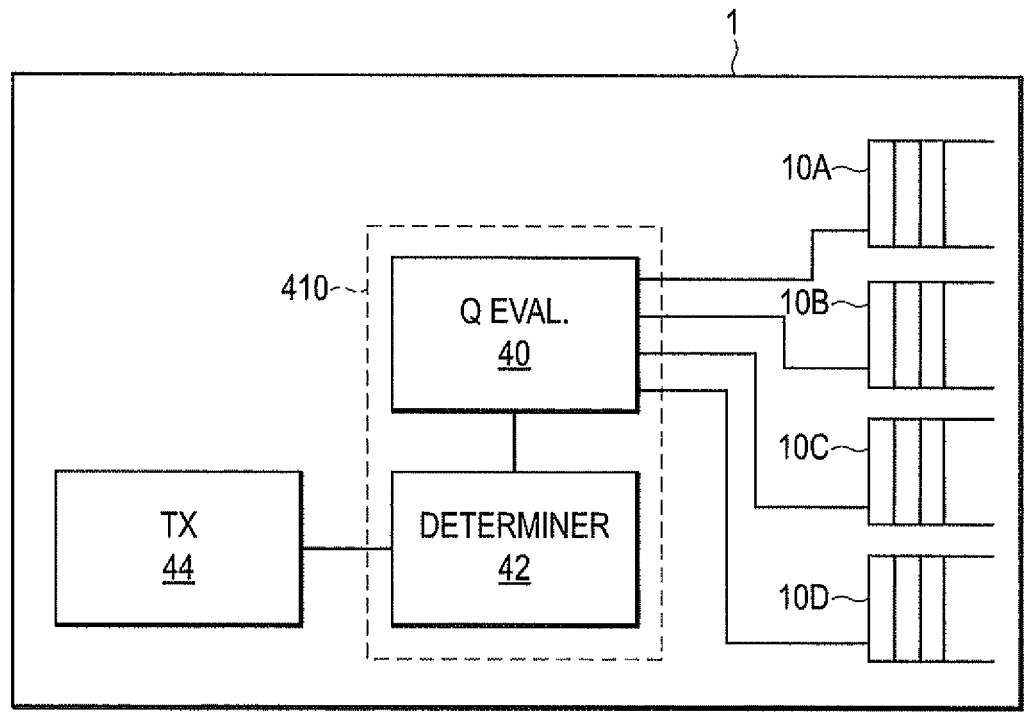
FIG. 6 is a schematic diagram illustrating modules in a network system of FIG. 1 or 2.

FIG. 6 is a schematic diagram illustrating modules of an interface unit in FIG. 1 or 2. The modules can be implemented using hardware and/or software. In an example, the modules are implemented as a processor (not shown) executing software instructions. Some modules correspond to steps in FIG. 5.

The egress queues 10A-D are shown here again, being queues for outbound data. The interface unit includes a controller 410, which can be the controller 110 in FIG. 1 or the controller 210 in FIG. 2. The controller 410 includes a queue evaluator (Q EVAL.) 40 configured to determine the queue state for each one of the plurality of egress queues 10A-D, and a determiner 42 configured to determine a selected egress queue, which is the one with the greatest difference between the determined queue state and the last reported queue state of the egress queue.

Further, the interface unit includes a transmitter 44 configured to send a message to the ingress side. The message includes the queue state of the selected egress queue.

Figure 7:
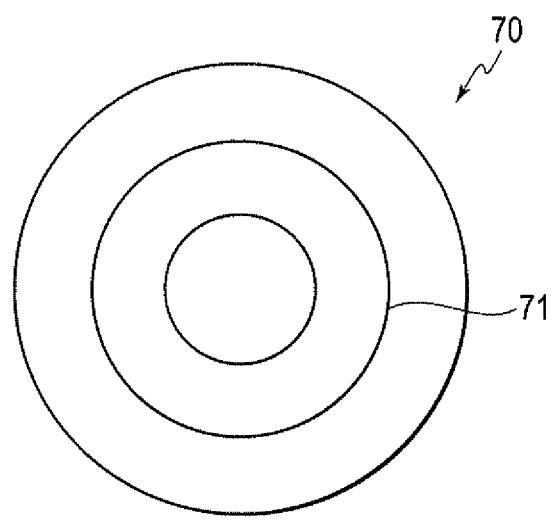
FIG. 7 shows one example of a computer program product comprising computer readable means.

FIG. 7 shows one example of a computer program product 70 comprising computer readable means. On this computer readable means a computer program 71 can be stored, which computer program can cause a processor to execute a method according to embodiments described herein. In this example, the computer program product 70 is an optical disc, such as a CD (compact disc) or a DVD (digital versatile disc) or a Blu-Ray disc. The computer program product could also be embodied as a memory of one or more interface units. While the computer program 71 is here schematically shown as a track on the depicted optical disk, the computer program 71 can be stored in any way that is suitable for the computer program product 70.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
    determining, by a controller of an integrated circuit (IC), a queue state for each one of a plurality of egress queues at least partially based on respective queue length, wherein a plurality of packets have arrived to the egress queues, each egress queue receives one packet at a time;
    selecting, by the controller of the IC, from the egress queues, a queue with a greatest size difference between a queue state of the queue at a first time and a queue state of the queue at a second time, wherein the queue state of the queue at the first time is sent in a message to at least one node that is an ingress node of a communication network, upon arrival of new packets at the second time, each egress queue again receives one packet;
    selecting other queue with a greatest size difference between a queue state of the other queue at the second time and a queue state of the other queue at a third time, wherein the queue state of the other queue at the second time is sent in a message to the at least one node; and
    reporting periodically via a message, by the controller of the IC, the queue state of the selected queue to the at least one node.

2. The method according to claim 1, wherein determining the queue state for each one of the egress queues further comprises:
    determining a drop probability respectively for the egress queues.

3. The method according to claim 2, wherein determining the drop probability respectively for the egress queues further comprises:
    using a variable taking up between 1 and 32 bits to represent the drop probability.

4. The method according to claim 1, wherein determining the queue state for each one of the egress queues further comprises:
    determining a queue length respectively for the egress queues.

5. The method according to claim 1, wherein the reporting comprises at least one of:
    reporting to the at least one node in a same device; and
    sending the message including the queue state to the at least one node in another device.

6. The method according to claim 1, further comprising:
    waiting until a predetermined data volume has been processed to repeat the determining, selecting and reporting operations.

7. The method according to claim 1, further comprising:
    waiting for a predetermined time to repeat the determining, selecting and reporting operations.

8. An apparatus, comprising:
    a plurality of egress queues respectively configured to queue packets for outputting; and
    a controller of an integrated circuit (IC) configured to determine a queue state for each one of the plurality of egress queues at least partially based on respectively queue length, wherein a plurality of packets have arrived to the egress queues, each egress queue receives one packet at a time, select, from the egress queues, a queue with a greatest size difference between a queue state of the queue at a first time and a queue state of the queue at a second time, wherein the queue state of the queue at the first time is sent in a message to at least one node that is an ingress node of a communication network, upon arrival of new packets at the second time, each egress queue again receives one packet, select other queue with a greatest size different between a queue state of the other queue at the second time and a queue state of the other queue at a third time, wherein the queue state of the other queue at the second time is sent in a message to the at least one node, and report periodically, via a message, the queue state of the selected queue to the at least one node.

9. The apparatus according to claim 8, wherein the controller is configured to determine a drop probability respectively for the egress queues.

10. The apparatus according to claim 9, wherein the controller is configured to use a variable taking up between 1 and 32 bits to represent the drop probability.

11. The apparatus according to claim 8, wherein the controller is configured to determine a queue length respectively for the egress queues.

12. The apparatus according to claim 8, further comprising:
    a transmitter configured to send a message that includes the queue state of the queue to the at least one node in another apparatus.

13. The apparatus according to claim 8, further comprising:
    a port corresponding to the at least one node.

14. The apparatus according to claim 8, wherein the controller further comprises:
    a queue evaluator configured to determine a queue state for each one of the egress queues; and a determiner configured to select the queue with the greatest size difference between the queue state of the queue at the first time and the queue state of the queue at the second time.

15. A system, comprising:

a plurality of interface units configured to have ingresses to receive packets coming into the system and egresses to transmit packets out of the system, wherein at least one interface unit includes:

a plurality of egress queues respectively configured to queue packets for outputting; and a controller of an integrated circuit (IC) configured to determine a queue state for each one of the plurality of egress queues at least partially based on respectively queue length, wherein a plurality of packets have arrived to the egress queues, each egress queue receives one packet at a time, select, from the egress queues, a queue with a greatest size difference between a queue state of the queue at a first time and a queue state of the queue at a second time, wherein the queue state of the queue at the first time is sent in a message to at least one node that is an ingress node of a communication network, upon arrival of new packets at the second time, each egress queue again receives one packet, and report periodically via a message, by the controller of the IC, the queue state of the selected queue to the at least one node.

16. The system of claim 15, wherein the controller further comprises:

a queue evaluator configured to determine a queue state for each one of the egress queues; and a determiner configured to select the queue with the greatest size difference between the queue state of the queue at the first time and the queue state of the queue at the second time.

17. The system of claim 15, wherein the controller is configured to determine at least one of a drop probability and a queue length respectively for the egress queues.

\* \* \* \* \*